Patented Apr. 3, 1934

1,953,629

UNITED STATES PATENT OFFICE 1,953,629

AGENTS AND METHODS FOR KILLING FLIES

Kaspar Pfaff and Michael Erlenbach, Frankfort-on-the-Main, Germany, assignors to Winthrop Chemical Company, Inc., New York, N. Y., a corporation of New York No Drawing. Application September 2, 1930, Serial No. 489,416. In Germany October 28, 1929

8 Claims. (Cl. 167—30)

The present invention relates to agents and methods for killing flies.

The problem of destroying flies in rooms and stables is of great economical importance. At present petroleum distillation products are sprayed for the purpose in question, to which a small quantity of pyrethrum extract has been added as active substance.

Now we have found that the benzoic acid esters or substitution products thereof, that is the compounds of the following general formula Ar.COO.X wherein Ar stands for an aryl group which may contain one or more substituents and X stands for an alkyl, aryl or aralkyl group, which are more easily accessible than pyrethrum extract, are very suitable for flies. The object can be attained, for instance, with a mixture of 25 parts of benzoic acid benzyl ester and 75 parts of petroleum distillate boiling between 200° C. and 260° C., by finely spraying 1 cc. of the said mixture for each cubic measure of the room. In the same manner there may also be used, for instance, the ethyl-, amyl-, phenyl-, benzyl-esters and other esters of chlorobenzoic acid, salicylic acid, 5-chloro-2-hydroxyphenyl-1-carboxylic acid etc.

We claim:

1. Agents for killing flies, comprising a compound of the following general formula:

Ar.COO.X wherein Ar stands for an aryl group and X stands for an alkyl or aralkyl group 2. Agents for killing flies comprising a compound of the following general formula:

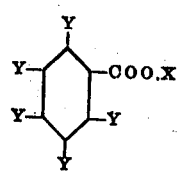

wherein X stands for an alkyl, aryl or aralkyl group, and Y stands for hydrogen or halogen, and a hydrocarbon.

3. Agents for killing flies comprising a compound of the following general formula:

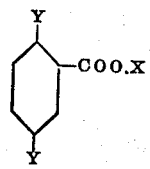

wherein X stands for an ethyl, amyl or benzyl group and Y stands for hydrogen, hydroxy or chlorine, and a high boiling hydrocarbon.

4. Agents for killing flies comprising a compound of the following general formula:

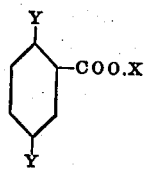

wherein X stands for an ethyl, amyl, phenyl or benzyl group and Y stands for hydrogen or chlorine, and a high boiling hydrocarbon.

5. Agents for killing flies comprising compounds of the following general formula:

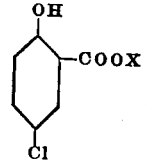

in which X stands for an ethyl, amyl or benzyl group, and a high boiling hydrocarbon.

6. Agents for killing flies comprising the amyl ester of 5-chloro-2-hydroxy-phenyl carboxylic acid and a high boiling hydrocarbon.

7. Agents for killing flies comprising benzoic and benzyl ester and a high-boiling hydrocarbon.

8. Agents for killing flies comprising a mixture of 25 parts of benzoic acid benzyl ester and 75 parts of a petroleum distillate boiling between 200° C. and 260° C.

KASPAR PFAFF.
MICHAEL ERLENBACH.